United States Patent
Minowa et al.

(10) Patent No.: US 9,550,910 B2
(45) Date of Patent: Jan. 24, 2017

(54) AQUEOUS METAL SURFACE TREATMENT AGENT FOR LITHIUM ION SECONDARY BATTERY

(71) Applicants: KYORITSU CHEMICAL & CO., LTD., Tokyo (JP); THE NIPPON SYNTHETIC CHEMICAL INDUSTRY CO., LTD., Osaka (JP)

(72) Inventors: Takahiro Minowa, Tokyo (JP); Hiroyuki Tanaka, Chiba (JP); Satoshi Yamazaki, Kanagawa (JP); Mitsuo Shibutani, Osaka (JP)

(73) Assignees: KYORITSU CHEMICAL & CO., LTD., Tokyo (JP); THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/958,403

(22) Filed: Dec. 3, 2015

(65) Prior Publication Data

US 2016/0083608 A1 Mar. 24, 2016

Related U.S. Application Data

(62) Division of application No. 14/005,742, filed as application No. PCT/JP2012/055662 on Mar. 6, 2012.

(30) Foreign Application Priority Data

Mar. 18, 2011 (JP) .................. 2011-060124

(51) Int. Cl.
| | |
|---|---|
| *H01M 4/66* | (2006.01) |
| *H01M 10/05* | (2010.01) |
| *C09D 129/04* | (2006.01) |
| *C08F 216/06* | (2006.01) |
| *C08K 3/00* | (2006.01) |
| *H01M 10/0525* | (2010.01) |
| *C09D 7/12* | (2006.01) |
| *C09D 5/00* | (2006.01) |
| *C08F 218/08* | (2006.01) |

(52) U.S. Cl.
CPC ........... *C09D 129/04* (2013.01); *C08F 216/06* (2013.01); *C08K 3/0016* (2013.01); *C09D 5/002* (2013.01); *C09D 7/1216* (2013.01); *C09D 7/1233* (2013.01); *H01M 4/667* (2013.01); *H01M 10/0525* (2013.01); *C08F 218/08* (2013.01); *Y02E 60/122* (2013.01)

(58) Field of Classification Search
CPC .... C08F 216/06; C08K 3/0016; C08K 5/0091; C09D 129/04; C09D 7/1216; C09D 7/1233; H01M 4/667; H01M 10/0525
See application file for complete search history.

(56) References Cited

U.S. PATENT DOCUMENTS

2006/0027629 A1* 2/2006 Inbe .................. C09D 5/086
228/101

FOREIGN PATENT DOCUMENTS

| JP | 2006299238 A | * | 11/2006 | |
|---|---|---|---|---|
| JP | 2007161795 | * | 6/2007 | .............. C08L 29/04 |
| JP | 2007161795 A | * | 6/2007 | |
| JP | 2007-326943 A | | 12/2007 | |
| JP | 2008-287888 A | | 11/2008 | |

* cited by examiner

*Primary Examiner* — Vu A Nguyen
(74) *Attorney, Agent, or Firm* — Osha • Liang LLP

(57) ABSTRACT

This is to provide an aqueous metal surface treatment agent for a lithium ion secondary battery which can improve interlaminar adhesiveness between a metal member and a resin coating layer such as a film or a coated film, and solvent resistance without using trivalent chromium.
The aqueous metal surface treatment agent for a lithium ion secondary battery comprises a polyvinyl alcohol resin containing 2 to 15 mol % of a 1,2-diol structural unit represented by the formula (1):

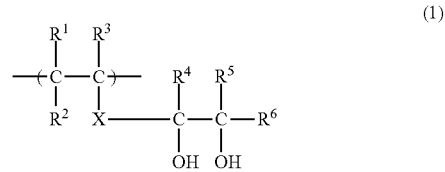

(1)

Having a degree of saponification of 90 to 99.9 mol % and an average degree of polymerization of 250 to 3000; and a metallic crosslinking agent.

6 Claims, No Drawings

AQUEOUS METAL SURFACE TREATMENT AGENT FOR LITHIUM ION SECONDARY BATTERY

TECHNICAL FIELD

The present invention relates to an aqueous metal surface treatment agent for a lithium ion secondary battery comprising a modified polyvinyl alcohol having a 1,2-diol structural unit and a metallic crosslinking agent.

BACKGROUND ART

A treatment agent for treating the surface of a metal has been used in broad fields such as automobiles, home electric appliances, architecture, foods, medicines, etc., in particular, it is useful for improving interlaminar adhesiveness between a metal material such as aluminum, magnesium, copper, iron, zinc, nickel or an alloy thereof, and various resin coating layers provided on the surface thereof, solvent resistance of the resin coating layer and corrosion resistance of the metal material.

Examples of the metal surface treatment agent of the prior art include an aqueous treating solution using trivalent chromium (Patent Literature 1). This treating agent can be used without using hexavalent chromium having high toxicity, but when it is exposed to high temperature environment, oxidation of chromium proceeds to generate hexavalent chromium. Thus, there are problems of environment.

In view of such a background, non-chromium treating agents have been investigated variously until now. In particular, in the uses which require corrosion resistance, adhesiveness with a paint, a resin or the like, there are problems that the performances are insufficient. Therefore, trivalent chromium treating agents which are harmful to human body or environment have yet been used.

Among these, a package for a lithium secondary battery, a film-attached tab lead member and the like are required to have severe adhesion reliability such as electrolyte resistance, HF resistance and the like, in the adhesion of a polyolefin film such as polyethylene and polypropylene with a metal such as aluminum, copper and nickel, and various non-chromium type techniques have been published (Patent Literature 2). However, it is the present status that the non-chromium type treating agents are inferior in surface treatment performances to those of the conventional trivalent chromium type treating agent.

PRIOR ART LITERATURES

Patent Literatures

[Patent Literature 1] JP 2006-40595A
[Patent Literature 2] JP 2006-202577A

SUMMARY OF THE INVENTION

Problems to be Solved by the Invention

An object of the present invention is to provide an aqueous metal surface treatment agent for improving interlaminar adhesiveness between a metal member for a lithium ion secondary battery and a resin coating layer such as a film or a coated film, and solvent resistance, without using chromium.

Means to Solve the Problems

The present invention relates to
(1) an aqueous metal surface treatment agent for a lithium ion secondary battery which comprises a polyvinyl alcohol resin containing 2 to 15 mol % of a 1,2-diol structural unit represented by the following formula (1):

[Formula 1]

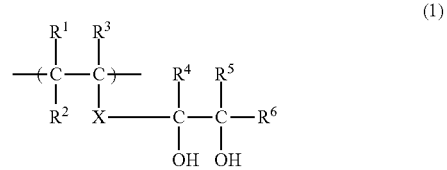

(1)

wherein $R^1$, $R^2$ and $R^3$ each independently represent a hydrogen atom or an organic group, X represents a single bond or a bonding chain, and $R^4$, $R^5$, and $R^6$ each independently represent a hydrogen atom or an organic group, and having a degree of saponification of 90 to 99.9 mol % and an average degree of polymerization of 250 to 3000; and a metallic crosslinking agent;
(2) the above mentioned metal surface treatment agent for a lithium ion secondary battery wherein a molar ratio of the polyvinyl alcohol resin:the metallic crosslinking agent is 1:5 to 500:1;
(3) the above mentioned metal surface treatment agent for a lithium ion secondary battery wherein the metallic crosslinking agent is selected from the group consisting of an oxide, a hydroxide, a complex compound, an organometallic compound, an organic acid salt and an inorganic acid salt of titanium, aluminum, zirconia, vanadium, molybdenum, cerium, lanthanum or tungsten.

Effects of the Invention

The present invention can improve interlaminar adhesiveness between a metal member and a resin coating layer such as a film or a coated film, and solvent resistance, without using trivalent chromium.

DESCRIPTION OF EMBODIMENTS

The metal surface treatment agent of the present invention is an aqueous composition containing a specific polyvinyl alcohol resin (also referred to as PVA resin), and a metallic crosslinking agent.

(Polyvinyl Alcohol Resin)

The polyvinyl alcohol resin in the present invention contains 2 to 15 mol % of a 1,2-diol structural unit represented by the formula (1):

[Formula 2]

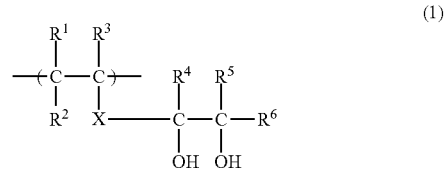

(1)

wherein $R^1$, $R^2$ and $R^3$ each independently represent a hydrogen atom or an organic group, X represents a single bond or a connecting chain, and $R^4$, $R^5$ and $R^6$ each independently represent a hydrogen atom or an organic group, and having a degree of saponification (measured according to JIS K6726) of 90 to 99.9 mol % and an average degree of polymerization of 250 to 3000.

$R^1$ to $R^3$ and $R^4$ to $R^6$ in the 1,2-diol structural unit represented by the formula (1) are desirably all hydrogen atoms, and a PVA resin having a structural unit represented by the formula (1'):

[Formula 3]

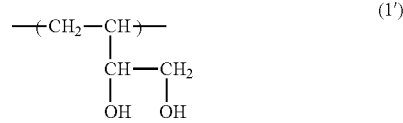

(1')

is suitably used.

$R^1$ to $R^3$ and $R^4$ to $R^6$ in the structural unit represented by the formula (1) may be an organic group which does not markedly impair the characteristics of the resin. The organic group is not particularly limited and preferably, for example, an alkyl group having 1 to 4 carbon atoms such as a methyl group, an ethyl group, an n-propyl group, an isopropyl group, an n-butyl group, an isobutyl group, a tert-butyl group and the like, and the organic group may have a substituent(s) such as a halogen group, a hydroxy group, an ester group, a carboxylic acid group, a sulfonic acid group and the like, if necessary.

X in the 1,2-diol structural unit represented by the formula (1) is a single bond or a connecting chain. In the points of thermal stability and structural stability under high temperature/acidic conditions, X is most preferably a single bond, and may be a connecting chain in the range it does not inhibit the effects of the present invention. Such a connecting chain is not particularly limited and may be mentioned, in addition to a hydrocarbon (these hydrocarbons may be substituted by a halogen such as fluorine, chlorine, bromine and the like) such as alkylene, alkenylene, alkynylene, phenylene, naphthylene and the like, —O—, —$(CH_2O)_m$—, —$(OCH_2)_m$—, —$(CH_2O)_mCH_2$—, —CO—, —COCO—, —$CO(CH_2)_m$CO—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —OSi$(OR)_2$—, —OSi$(OR)_2$O—, —$Ti(OR)_2$—, —$OTi(OR)_2$—, —$OTi(OR)_2$O—, —Al(OR)—, —OAl(OR)—, —OAl(OR)O— (Rs are each independently an optional substituent, preferably a hydrogen atom or an alkyl group, and m is a natural number and preferably 1 or 2) and the like. Among these, in the points of stability at the time of preparation or at the time of use, the connecting chain is preferably an alkylene group having 6 or less carbon atoms, particularly preferably a methylene group or —$CH_2OCH_2$—.

A degree of saponification (measured according to JIS K6726) of the PVA resin used in the present invention is 90.0 to 99.9 mol %, preferably 95.0 to 99.9 mol %, more preferably 97.0 to 99.9 mol %. If the degree of saponification is lower than 90.0 mol, the crosslinking density may be lowered and a film strength or water resistance become to be insufficient. Also, the PVA resin having higher than 99.9 mol % is difficulty prepared so that it is not preferred. The degree of saponification in the present invention is defined to be a molar number of the hydroxy group based on the total (mol) of the modified group moiety like derived from 3,4-diacyloxy-1-butene, and a vinyl ester such as vinyl acetate and the like.

An average degree of polymerization measured according to JIS K6726 of the PVA resin of the present invention is 250 to 3000, particularly 300 to 2800 or 400 to 2700, further 420 to 2500, 450 to 2000 or 1000 to 1500 is preferably used.

A content of the 1,2-diol structural unit contained in the PVA resin is 2 to 15 mol %, particularly 3 to 13 mol %, further 5 to 10 mol % is preferred. The content of the 1,2-diol structural unit in the PVA resin can be obtained from $^1$H-NMR spectrum (solvent: DMSO-$d_6$, internal standard: tetramethylsilane) of the completely saponified PVA resin. Specifically, it can be calculated from peak areas derived from a hydroxy group proton, a methyne proton, a methylene proton, a methylene proton in the main chain, and a hydroxy group proton connecting to the main chain and the like in the 1,2-diol unit.

The PVA resin which can be used in the present invention can be prepared by the method described in, for example, JP 2009-149865A or WO 2009-069644A pamphlet.

(Metallic Crosslinking Agent)

The metallic crosslinking agent in the present invention is not limited so long as it is a metal compound having an ability of crosslinking the PVA resin, but the metal does not include Cr. The metallic crosslinking agent includes, for example, a metal compound containing one or more metals selected from the group consisting of Ti, Zr, Al, V, Mo, Ce, La and W. The metal compound is not particularly limited, and includes, for example, an oxide, a hydroxide, a complex compound, an organometallic compound, a metal alkoxide, an organic acid salt and an inorganic acid salt of these metals and the like.

Specifically, the complex compound includes titanium diisopropoxybis(triethanolaminate), titanium lactate, titanium tetrakisacetonate, ammonium bis(oxalato)oxotitanate, zirconium tetrakis(acetylacetonato), zirconium tributoxy (monoacetylacetonate), zirconium acetylacetonate, tetrakis (dimethylamino) zirconium, aminocarboxylic acidic zirconium, aluminum tris(acetylacetonate), vanadyl acetylacetonate, vanadium acetylacetonate, molybdenum dioxide acetylacetonate, lanthanum acetylacetonate, cerium acetylacetonate, ammonium pentanitratocerate, ammonium hexanitratocerate, tungsten acetylacetonate, hexacarbonyl tungsten and the like.

The organometallic compound includes tetraisopropyl titanate, tetrabutyl titanate, tetrapropyl zirconate, tetrabutyl zirconate, triisobutyl aluminum, tungsten hexacarbonyl and the like.

The metal alkoxide includes titanium methoxide, titanium ethoxide, titanium propoxide, titanium butoxide, zirconium methoxide, zirconium ethoxide, zirconium butoxide, zirconium propoxide, aluminum ethoxide, aluminum butoxide, vanadium methoxide, vanadium ethoxide, vanadium propoxide, vanadium butoxide, vanadium aluminum propoxide, molybdenum methoxide, molybdenum ethoxide, molybdenum isopropoxide, molybdenum butoxide, molybdenum phenoxide, molybdenum phenylethoxide, molybdenum phenoxyethoxide, cerium methoxide, cerium ethoxide, cerium isopropoxide, cerium butoxide, lanthanum methoxide, lanthanum ethoxide, lanthanum isopropoxide, lanthanum butoxide, tungsten methoxide, tungsten ethoxide, tungsten isopropoxide, tungsten butoxide and the like.

The organic acid salt includes titanium acetate, titanium citrate, titanium oxalate, ammonium oxydioxalate, titanium tetraoleate, zirconium octanoate, zirconium acetate, zirconyl acetate, zirconium octylate, zirconyl octylate, aluminum oxalate, aluminum tartrate, aluminum benzoate, aluminum oleate, aluminum citrate, aluminum gluconate, aluminum stearate, aluminum lactate, aluminum butyrate, vanadium acetate, vanadium oxyoxalate, vanadium octanoate, vanadium naphthenate, molybdenum acetate, molybdenum butyrate, lanthanum octanoate, lanthanum formate, lanthanum acetate, lanthanum oxalate, lanthanum stearate, cerium acetate, cerium oxalate, cerium stearate, and the like.

The inorganic acid salt includes titanium chloride, titanium hydrofluoride, titanium nitrate, titanium oxynitrate, zirconium chloride, fluorozirconic acid, zirconium chloride oxide, zirconium phosphate, ammonium zirconium carbonate hydroxide, ammonium zirconium carbonate, zirconium silicate, zirconium nitrate, zirconium sulfate, zirconium titanate, aluminum chloride, aluminum phosphate, aluminum sulfate, aluminum nitrate, aluminum perchlorate, aluminum titanate, vanadium chloride, vanadium dichloride oxide, vanadium trichloride oxide, ammonium metavanadate, vanadyl sulfate, vanadium titanate, molybdenum chloride, molybdenum sulfate, molybdenum nitrate, molybdenum phosphate, molybdic acid, ammonium molybdate, lanthanum chloride, lanthanum perchlorate, lanthanum dititanate, lanthanum sulfate, lanthanum phosphate, cerium chloride, cerium perchlorate, cerium nitrate, cerium sulfate, cerium phosphate, tungsten chloride, tungsten dichloride dioxide, tungsten carbonate, sodium tungstate, ammonium tungstate, ammonium phosphotungstate and the like. Preferred metallic crosslinking agent includes titanium diisopropoxybis(triethanolaminate), titanium lactate, aminocarboxylic acidic zirconium, zirconium nitrate, aluminum trisacetylacetonate, vanadyl acetylacetonate, vanadium acetylacetonate, molybdenum dioxide acetylacetonate, lanthanum acetylacetonate, cerium acetylacetonate and tungsten acetylacetonate.

(Molar Ratio of Polyvinyl Alcohol Resin:Metallic Crosslinking Agent)

In the present invention, a molar ratio of the polyvinyl alcohol resin:the metallic crosslinking agent is preferably 1:5 to 500:1, more preferably 1:3 to 300:1, particularly preferably 1:2.5 to 100:1, and most preferably 10:1 to 100:1. Here, calculation of the molar ratio to the metallic crosslinking agent can be carried out based on an introduced amount of the modified group such as a group derived from 3,4-diacyloxy-1-butene of the polyvinyl alcohol resin and an average molecular weight of the monomer unit obtained depending on the degree of saponification.

(Amounts of Polyvinyl Alcohol Resin and Metallic Crosslinking Agent)

In the aqueous surface treatment agent of the present invention, a total amount of the polyvinyl alcohol resin and the metallic crosslinking agent based on the whole treatment agent is preferably 0.01 to 20% by weight, more preferably 0.1 to 10% by weight, particularly preferably 0.5 to 5% by weight. The remainder of the treatment agent other than the polyvinyl alcohol resin and the metallic crosslinking agent can be water or an aqueous solvent, for example, a mixture of water and a water-soluble alcohol, and the like.).

(Optional Component)

The surface treatment agent of the present invention may contain a conventionally used additive(s) within the range which does not impair the effects of the present invention in addition to the polyvinyl alcohol resin, the metallic crosslinking agent and water or an aqueous solvent. The additive includes an organic compound having one or more carboxyl group in the molecule (for example, an organic acid such as acetic acid, oxalic acid, malonic acid, malic acid, tartaric acid, mellitic acid and the like.), a rheology characteristic improver (a thixotropic property improver), a pH adjustor, an antiseptic, an antioxidant and the like.

(Surface Treatment Method)

There is a surface treatment method of a metal member including the step of treating the surface of a metal member using the metal surface treatment agent of the present invention.

The metal member is not particularly limited so long as it is a member of a shapable metal and a metal member on the surface of which is provided a resin coating layer, and includes for example, aluminum, magnesium, copper, iron, zinc, nickel, stainless, and an alloy thereof. The metal of the metal member is preferably aluminum, copper, nickel and stainless, particularly preferably aluminum, copper and nickel. The metal member includes a metal case for electronic parts, a package for a lithium secondary battery, a film-attached tab lead member and a tab terminal.

Surface treatment of a metal member can be carried out by the conventionally known methods such as roll coating, spin coating, dipping method, spraying method and the like. According to the treatment method of the present invention, aging treatment can be carried out at 100 to 200° C., preferably at 100 to 160° C., for 5 seconds to 60 minutes, preferably for 10 seconds to 30 minutes after the treatment such as coating and the like. Improved effects in corrosion resistance and adhesiveness with a resin material can be obtained by the aging treatment. A film of the metal surface treatment agent obtained by aging treatment preferably has a thickness of 0.01 to 10 m, particularly preferably 0.1 to 3 μm.

There is metal member surface-treated by the treating agent of the present invention. A resin coating layer may be formed on the surface of the surface-treated metal member. Interlaminar adhesiveness between the metal member and the resin coating layer such as a film or a coated film, and solvent resistance can be improved. The resin coating layer includes a polymer film or a coating film having mechanical strength, sealability, electric insulation, heat resistance and/or solvent resistance and the like. The polymer includes a polyolefin such as polyethylene, polypropylene and the like, polyester, polyamide, polyimide, poly(vinylidene fluoride), urethane and the like, and is preferably a polyolefin such as polyethylene, polypropylene and the like.

There is metal component which contain a resin coating layer on the surface of the metal member surface-treated by the treating agent of the present invention. The resin coating layer can be provided on the surface of the surface-treated metal member according to the above-mentioned conventionally known method. It can be prepared, for example, by hot-melting a polymer film on the surface of the surface-treated metal member, or a polymer is coated on the surface of the surface-treated metal member to form a coated film. The metal component includes a metal member coated by a resin coating layer, for example, a metal case for electronic parts, a metal laminate package for a lithium secondary battery and/or a capacitor, film-attached tab lead member, a surface treated tab terminal, metal/resin mold parts and the like.

There is article which contains the metal component treated by the treating agent of the present invention. The article is not particularly limited so long as it contains metal component including a metal material such as aluminum, magnesium, copper, iron, zinc, nickel and an alloy thereof, and various resin coating layers provided on the surface thereof, and can be article of wide range of fields such as automobile, home electric appliances, architecture, foods, medicines and the like. The article may be preferably, for example, a laminate package type battery, a laminate package type capacitor, an inside seal for automobile, a glass channel and the like.

EXAMPLES

Preparation of PVA Resin (A1)

In a reaction vessel equipped with a reflux condenser, a dropping funnel and a stirrer were charged 1000 parts of vinyl acetate, 400 parts of methanol and 120 parts of 3,4-diacetoxy-1-butene, and then, 0.06 mol % (based on the charged vinyl acetate) of azobisisobutyronitrile was added to the mixture. The temperature of the mixture was raised under nitrogen stream and stirring, and polymerization was started at boiling point. At the time when the degree of polymerization of vinyl acetate became 75%, m-dinitrobenzene was added to the mixture to stop the polymerization, subsequently the unreacted vinyl acetate monomer was removed outside by the method of blowing a methanol vapor to prepare a methanol solution of the copolymer.

Then, the above-mentioned methanol solution was further diluted with methanol to adjust the concentration to 30% and charged in a kneader. While maintaining the solution temperature to 35° C., 2% methanol solution of sodium hydroxide was added in such an amount that it became 8 mmol based on the total 1 mol of the vinyl acetate structural unit and the 3,4-diacetoxy-1-butene structural unit in the copolymer to carry out saponification. With the progress of the saponification, saponified products were precipitated and when they became particulate states, they were collected by filtration, washed well with methanol and dried in a hot air drier to prepare an objective PVA resin (A1).

When the degree of saponification of the obtained PVA resin (A1) was analyzed by an amount of the residual vinyl acetate and a consumed amount of an alkali required for hydrolysis of 3,4-diacetoxy-1-butene, it was 99.4 mol %. Also, when the average degree of polymerization was analyzed according to JIS K 6726, it was 1200. Further, when the content of the 1,2-diol structural unit represented by the formula (1') was calculated from the integrated value measured by $^1$H-NMR (300 MHz proton NMR, d6-DMSO solution, internal standard substance; tetramethylsilane, 50° C.), it was 5.7 mol %, and the average molecular weight of the monomer unit calculated therefrom was 46.8.

Preparation of PVA Resin (A2)

In a reaction vessel equipped with a reflux condenser, a dropping funnel and a stirrer were charged 1000 parts of vinyl acetate, 1120 parts of methanol and 65.3 parts of 3,4-diacetoxy-1-butene, then, 0.11 mol % (based on the charged vinyl acetate) of azobisisobutyronitrile was added to the mixture. The temperature of the mixture was raised under nitrogen stream and stirring, and polymerization was started at boiling point simultaneously addition of 20% methanol solution of 3,4-diacetoxy-1-butene was started according to the HANNA method, which was added in an amount of 93.58 parts until the degree of polymerization became 95%.

Incidentally, 3,4-diacetoxy-1-butene was so charged that it reacts with vinyl acetate uniformly in an amount obtained from a HANNA equation [Reactivity ratio (r) of 3,4-diacetoxy-1-butene=0.701, Reactivity ratio (r) of vinyl acetate=0.710] so as to comply with the polymerization rate. When the degree of polymerization of the vinyl acetate became 95%, 10 ppm of m-dinitrobenzene (based on the charged vinyl acetate) was added to the mixture as a polymerization inhibitor to terminate the polymerization. Subsequently, the unreacted vinyl acetate monomer was removed outside by the method of blowing a methanol vapor therein to obtain a methanol solution of the copolymer.

Then, the above-mentioned methanol solution was further diluted with methanol to adjust the concentration to 30% and charged in a kneader. While maintaining the solution temperature to 35° C., 2% methanol solution of sodium hydroxide was added in such an amount that it becomes 9 mmol based on the total 1 mol of the vinyl acetate structural unit and the 3,4-diacetoxy-1-butene structural unit in the copolymer to carry out saponification. With the progress of the saponification, saponified products were precipitated and when they became particulate states, they were collected by filtration, washed well with methanol and dried in a hot air drier to prepare an objective PVA resin (A2).

When the degree of saponification of the obtained PVA resin (A2) was analyzed by an amount of the residual vinyl acetate and a consumed amount of an alkali required for hydrolysis of 3,4-diacetoxy-1-butene, it was 99.5 mol %. Also, when the average degree of polymerization was analyzed according to JIS K 6726, it was 470. Further, when the content of the 1,2-diol structural unit represented by the formula (1') was calculated from the integrated value measured by $^1$H-NMR (300 MHz proton NMR, d6-DMSO solution, internal standard substance; tetramethylsilane, 50° C.), it was 5.8 mol %, and the average molecular weight of the monomer unit calculated therefrom was 46.8.

Preparation of PVA Resin (A3)

In a reaction vessel equipped with a reflux condenser, a dropping funnel and a stirrer were charged 1000 parts of vinyl acetate, 450 parts of methanol and 60 parts of 3,4-diacetoxy-1-butene, then, 0.055 mol % (based on the charged vinyl acetate) of azobisisobutyronitrile was added to the mixture. The temperature of the mixture was raised under nitrogen stream and stirring, and polymerization was started. At the time when the degree of polymerization of vinyl acetate became 80%, m-dinitrobenzene was added to the mixture to stop the polymerization, subsequently the unreacted vinyl acetate monomer was removed outside by the method of blowing a methanol vapor to prepare a methanol solution of the copolymer.

Then, the above-mentioned methanol solution was further diluted with methanol to adjust the concentration to 30% and charged in a kneader. While maintaining the solution temperature to 35° C., 2% methanol solution of sodium hydroxide was added in such an amount that it became 8 mmol based on the total 1 mol of the vinyl acetate structural unit and the 3,4-diacetoxy-1-butene structural unit in the copolymer to carry out saponification. With the progress of the saponification, saponified products were precipitated and when they became particulate states, they were collected by filtration, washed well with methanol and dried in a hot air drier to prepare an objective PVA resin (A3).

When the degree of saponification of the obtained PVA resin (A3) was analyzed by an amount of the residual vinyl acetate and a consumed amount of an alkali required for hydrolysis of 3,4-diacetoxy-1-butene, it was 99.6 mol %. Also, when the average degree of polymerization was analyzed according to JIS K 6726, it was 1200. Further, when the content of the 1,2-diol structural unit represented by the formula (1') was calculated from the integrated value measured by $^1$H-NMR (300 MHz proton NMR, d6-DMSO solution, internal standard substance; tetramethylsilane, 50°

C.), it was 2.9 mol %, and the average molecular weight of the monomer unit calculated therefrom was 45.4.

In accordance with the preparation method of the above-mentioned PVA resins (A1) to (A3), the following PVA resins (A4) to (A7) shown in Table 1 were prepared.

TABLE 1

| PVA resin | Degree of saponification (mol %) | Average molecular weight of recurring structural unit | Average degree of polymerization | Content of 1,2-diol structural unit (mol %) |
| --- | --- | --- | --- | --- |
| A4 | 99.8 | 45.7 | 1800 | 3.8 |
| A5 | 99.3 | 47.6 | 1300 | 7.4 |
| A6 | 98.5 | 45.3 | 2700 | 1.48 |
| A7 | 98.8 | 49.2 | 400 | 10.7 |

[1. Corrosion Resistance of the Surface Treated Aluminum Foil, and Adhesiveness Thereof with PP Film]

(1) Metal Member

An aluminum foil of a 1085 material (both glossy) cut to a shape having a thickness of 20 μm, a width of 1.5 cm, and a length of 4 cm was used as a metal member.

(2) Alkali Degreasing

The metal member was degreased by dipping it in a 10 wt % aqueous sodium hydroxide solution for 10 seconds. After the degreasing treatment, the metal member was dipped in deionized water for 20 seconds twice to carry out the washing.

(3) Preparation of the Treating Agent of the Present Invention and Surface Treatment (Treatment Using a Modified PVA Having a 1,2-Diol Structural Unit, and Metallic Cross-linking Agent)

By using the above-mentioned PVA resins (A1 to A3), and starting materials shown in Table 2, as shown in the following mentioned Examples 1-1 to 1-9, X-1, Y-1 and 1-10 to 1-18 and Comparative examples Z-1 and Z-2, treating agents of Examples of the present invention and Comparative examples were prepared, and a surface treatment of the metal members were carried out by using these.

TABLE 2

| Name of material | Molecular weight | Degree of polymerization | Degree of saponification (mol %) | Others |
| --- | --- | --- | --- | --- |
| Unmodified PVA | | 2400 | 98.0~99.0 | |
| TC-400 (available from Matsumoto Fine Chemical Co., Ltd.) | 461.9 | — | — | Titanium diisopropoxy-bis(triethanolaminate) |
| TC-310 (available from Matsumoto Fine Chemical Co., Ltd.) | 259.9 | — | — | Titanium lactate |
| Zircosol AC7 (available from Daiichi Kigenso Kagaku Kogyo Co., Ltd.) | 263.2 | — | — | Ammonium zirconium carbonate |

Example 1-1

Into deionized water were dissolved PVA resin (A1) and TC-400 with a molar ratio of 30:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.8 μm.

Example 1-2

Into deionized water were dissolved PVA resin (A1) and TC-400 with a molar ratio of 30:1 to obtain 2 wt % of a treating agent. An aluminum foil which had been subjected to alkali degreasing (2) was dipped in the obtained treating agent, then, aging thereof was carried out at 160° C. for 30 minutes to carry out a surface treatment. A thickness of the surface treated film after aging was 2.7 μm.

Example 1-3

Into deionized water were dissolved PVA resin (A1) and TC-400 with a molar ratio of 30:1 to obtain 2 wt % of a treating agent. An aluminum foil which had been subjected to alkali degreasing (2) was dipped in the obtained treating agent, then, aging thereof was carried out at 200° C. for 30 minutes to carry out a surface treatment. A thickness of the surface treated film after aging was 2.9 μm.

Example 1-4

Into deionized water were dissolved PVA resin (A1) and TC-400 with a molar ratio of 10:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.8 μm.

Example 1-5

Into deionized water were dissolved PVA resin (A1) and TC-400 with a molar ratio of 100:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.6 μm.

Example 1-6

Into deionized water were dissolved PVA resin (A1) and TC-400 with a molar ratio of 30:1 to obtain 5 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 3.1 μm.

Example 1-7

Into deionized water were dissolved PVA resin (A1) and TC-400 with a molar ratio of 30:1 to obtain 0.5 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.4 μm.

Example 1-8

Into deionized water were dissolved PVA resin (A1) and TC-310 with a molar ratio of 30:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.7 μm.

Example 1-9

Into deionized water were dissolved PVA resin (A1) and Zircosol AC7 with a molar ratio of 30:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.7 μm.

Example X-1

Into deionized water were dissolved PVA resin (A2) and TC-400 with a molar ratio of 30:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.8 μm.

Example Y-1

Into deionized water were dissolved PVA resin (A3) and TC-400 with a molar ratio of 30:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.8 μm.

Comparative Example Z-1

Into deionized water were dissolved unmodified PVA and TC-400 with a molar ratio of 30:1 to obtain 2 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 2.9 μm.

Example 1-10

Into deionized water were dissolved PVA resin (A1), TC-400 (B1) and fluorozirconic acid (B2) with a molar ratio of 30:1:25 to obtain 5 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 1.4 μm.

Example 1-11

Into deionized water were dissolved PVA resin (A1), TC-400 (B1) and fluorozirconic acid (B2) with a molar ratio of 30:1:25 to obtain 5 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.5 μm.

Example 1-12

Into deionized water were dissolved PVA resin (A4), TC-400 (B1) and fluorozirconic acid (B2) with a molar ratio of 30:1:25 to obtain 5 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.5 μm.

Example 1-13

Into deionized water were dissolved PVA resin (A5), TC-400 (B1) and fluorozirconic acid (B2) with a molar ratio of 30:1:13 to obtain 2.7 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.3 μm.

Example 1-14

Into deionized water were dissolved PVA resin (A5), TC-400 (B1) and fluorozirconic acid (B2) with a molar ratio of 30:1:25 to obtain 5 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.5 μm.

Example 1-15

Into deionized water were dissolved PVA resin (A5), TC-400 (B1) and fluorozirconic acid (B2) with a molar ratio of 30:1:75 to obtain 11 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.8 μm.

Example 1-16

Into deionized water were dissolved PVA resin (A6), TC-400 (B1) and fluorozirconic acid (B2) with a molar ratio of 30:1:25 to obtain 5 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.6 μm.

Example 1-17

Into deionized water were dissolved PVA resin (A7), TC-400 (B1) and fluorozirconic acid (B2) with a molar ratio of 30:1:25 to obtain 5 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 1.3 μm.

Example 1-18

Into deionized water were dissolved PVA resin (A1) and fluorozirconic acid (B2) with a molar ratio of 30:25 to obtain 4.6 wt % of a treating agent. An aluminum foil which had been subjected to alkali degreasing (2) was dipped in the obtained treating agent, then, aging thereof was carried out at 100° C. for 30 minutes to carry out a surface treatment. A thickness of the surface treated film after aging was 1.4 μm.

Comparative Example Z-2

Into deionized water were dissolved TC-400 (B1) and fluorozirconic acid (B2) with a molar ratio of 1:25 to obtain 3.8 wt % of a treating agent. An aluminum foil which had been subjected to alkali degreasing (2) was dipped in the obtained treating agent, then, aging thereof was carried out at 160° C. for 1 minute to carry out a surface treatment. A thickness of the surface treated film after aging was 0.6 μm.

Preparation conditions of the above-mentioned respective Examples and Comparative examples are summarized in Table 3 and Table 4.

TABLE 3

| | Components of treating agent | | | Aging conditions | | Concentration |
| --- | --- | --- | --- | --- | --- | --- |
| Example | PVA resin | Metallic crosslinking agent (B) | Molar ratio (A:B) | Drying temperature (° C.) | Time (min) | of solution (wt %) |
| 1-1 | (A1) | TC-400 | 30:1 | 100 | 30 | 2 |
| 1-2 | (A1) | TC-400 | 30:1 | 160 | 30 | 2 |
| 1-3 | (A1) | TC-400 | 30:1 | 200 | 30 | 2 |
| 1-4 | (A1) | TC-400 | 10:1 | 100 | 30 | 2 |
| 1-5 | (A1) | TC-400 | 100:1 | 100 | 30 | 2 |
| 1-6 | (A1) | TC-400 | 30:1 | 100 | 30 | 5 |
| 1-7 | (A1) | TC-400 | 30:1 | 100 | 30 | 0.5 |
| 1-8 | (A1) | TC-310 | 30:1 | 100 | 30 | 2 |
| 1-9 | (A1) | Zrcosol AC7 | 30:1 | 100 | 30 | 2 |
| X-1 | (A2) | TC-400 | 30:1 | 100 | 30 | 2 |
| Y-1 | (A3) | TC-400 | 30:1 | 100 | 30 | 2 |
| Z-1 | Unmodified PVA | TC-400 | 30:1 | 100 | 30 | 2 |

TABLE 4

| | Components of treating agent | | | | Aging conditions | | Concentration |
| --- | --- | --- | --- | --- | --- | --- | --- |
| Example | PVA resin | Metallic crosslinking agent (B1) | Metallic crosslinking agent (B2) | Molar ratio (A:B1:B2) | Drying temperature (° C.) | Time (min) | of solution (wt %) |
| 1-10 | (A1) | TC-400 | Fluorozirconic acid | 30:1:25 | 100 | 30 | 5 |
| 1-11 | (A1) | TC-400 | Fluorozirconic acid | 30:1:25 | 160 | 1 | 5 |
| 1-12 | (A4) | TC-400 | Fluorozirconic acid | 30:1:25 | 160 | 1 | 5 |
| 1-13 | (A5) | TC-400 | Fluorozirconic acid | 30:1:13 | 160 | 1 | 5 |
| 1-14 | (A5) | TC-400 | Fluorozirconic acid | 30:1:25 | 160 | 1 | 5 |
| 1-15 | (A5) | TC-400 | Fluorozirconic acid | 30:1:75 | 160 | 1 | 5 |
| 1-16 | (A6) | TC-400 | Fluorozirconic acid | 30:1:25 | 160 | 1 | 5 |
| 1-17 | (A7) | TC-400 | Fluorozirconic acid | 30:1:25 | 160 | 1 | 5 |
| 1-18 | (A1) | — | Fluorozirconic acid | 30:0:25 | 100 | 30 | 4.6 |
| Comparative example Z-2 | — | TC-400 | Fluorozirconic acid | 0:1:25 | 160 | 1 | 3.8 |

(4) Preparation of Treating Agent of the Prior Art and Surface Treatment (Treatment Using Chitosan and Chromium Fluoride)

As described in the following Comparative examples 1-1 and 1-2, treating agents of the prior art were prepared and surface treatment of a metal member was carried out by using these.

Comparative Example 1-1

Into deionized water were dissolved glycerylated chitosan and 1,2,3,4-butanetetracarboxylic acid with a weight ratio of 2:1. To the obtained solution was added trivalent chromium fluoride so that the weight ratio thereof to that of the glycerylated chitosan became 2:1 to obtain 2 wt % of a treating agent. An aluminum foil which had been subjected to alkali degreasing (2) was dipped in the obtained treating agent, then, aging thereof was carried out at 160° C. for 30 minute to carry out a surface treatment. A thickness of the surface treated film after aging was 2.5 μm.

Comparative Example 1-2

Into deionized water were dissolved glycerylated chitosan and 1,2,3,4-butanetetracarboxylic acid with a weight ratio of 1:1 to obtain 2 wt % of a treating agent. An aluminum foil which had been subjected to alkali degreasing (2) was dipped in the obtained treating agent, then, aging thereof was carried out at 160° C. for 30 minute to carry out a surface treatment. A thickness of the surface treated film after aging was 2.4 μm.

Preparation conditions of the above-mentioned respective Comparative example 1-1 and 1-2 are summarized in Table 5.

TABLE 5

| Comparative example | Components of treating agent | | | Aging conditions | | Concentration of solution (wt %) |
| | Polymer (A) | Metal component (B) | A:B ratio | Drying temperature (° C.) | Time (min) | |
| --- | --- | --- | --- | --- | --- | --- |
| 1-1 | Glycerylated chitosan + butanetetra-carboxylic acid | CrF$_3$ | 4:1 (weight ratio) | 160 | 30 | 2 |
| 1-2 | Glycerylated chitosan + butanetetra-carboxylic acid | — | — | 160 | 30 | 2 |

Whitening of aluminum surface: Degree of dissolution of Al foil was observed by naked eyes Adhesiveness: Al/PP was peeled off by hand, and the stress was confirmed Evaluation results of corrosion resistance (whitening at the aluminum surface) and adhesiveness before and after dipping in hydrofluoric acid are shown in Table 6.

TABLE 6

| | Initial stage PP adhesiveness | After dipping in hydrofluoric acid | |
| | | PP adhesiveness | Whitening at aluminum surface |
| --- | --- | --- | --- |
| Example 1-1 | ◎ | ◎ | ◎ |
| Example 1-2 | ◎ | ○ | ◎ |
| Example 1-3 | ○ | ○ | ◎ |
| Example 1-4 | ○ | ○ | ◎ |
| Example 1-5 | ○ | ○ | ◎ |
| Example 1-6 | ○ | ○ | ◎ |
| Example 1-7 | ◎ | ◎ | ◎ |
| Example 1-8 | ○ | ○ | ○ |
| Example 1-9 | ○ | ○ | ○ |
| Comparative example 1-1 | Δ~○ | Δ~○ | X |
| Comparative example 1-2 | Δ | Δ | X |
| Example X-1 | ○ | ○ | ○ |
| Example Y-1 | ○ | ○ | ○ |
| Comparative example Z-1 | Δ | Δ | Δ |

* Evaluation standard of adhesiveness (Good) ◎ > ○ > Δ > X (Bad)
Evaluation standard of aluminum surface whitening (Good) ◎ > ○ > Δ > X (Bad)

(7) PP Welding 2

To each aluminum foil which has been treated by Examples 1-1, 1-10 to 1-18 and Z-2 of (3) and Comparative (5) PP Welding 1 (which Corresponds to Film Laminating Step to Aluminum Foil at the Time of Preparing Aluminum Laminate Film)

An acid-modified non-stretched PP film was heat sealed (using FCB-200, available from FUJIIMPULSE CO., LTD.), twice, to each aluminum foil treated by Example 1-1 to 1-9, X-1, Y-1 and Comparative example Z-1 of (3), and Comparative examples 1-1 and 1-2 of (4) at 200° C. for 3 sec to prepare respective test pieces.

(6) Evaluation of Corrosion Resistance and Adhesiveness of Test Piece of PP Welding 1 after Dipping in Hydrofluoric Acid Effects of the surface treatment on the aluminum foil were evaluated by dipping the above-mentioned test pieces in 1% hydrofluoric acid under room temperature for 15 minutes, and whitening (corrosion resistance) of the aluminum surface and adhesiveness were measured by the following mentioned method.

example 1-1 of (4) was welded an acid-modified non-stretched PP film on a hot plate at 140° C.×10 sec and 165° C.×20 sec, and further welded in an oven at 240° C.×30 sec to prepare respective test pieces.

(8) Evaluation of Adhesiveness of PP Welding 2 Test Piece after Dipping in Electrolyte The above-mentioned test pieces were dipped in a 1:1 vol/vol % solution of EC (ethylene carbonate)/DEC (diethylene carbonate) containing 1 mol/L of LiPF6 at 85° C.×7 days, and adhesiveness after dipping in an electrolyte was measured according to the following method and evaluated.

Adhesiveness: Al/PP was peeled off by hand, and the stress was confirmed

The evaluation results of the adhesiveness before and after dipping in an electrolyte are shown in Table 7.

TABLE 7

|  | Initial stage PP adhesiveness | After dipping in electrolyte PP adhesiveness |
|---|---|---|
| Example 1-1 | ◎ | △ |
| Example 1-10 | ◎ | ○ |
| Example 1-11 | ◎ | ○ |
| Example 1-12 | ◎ | ○~◎ |
| Example 1-13 | ◎ | ○~◎ |
| Example 1-14 | ◎ | ◎ |
| Example 1-15 | ◎ | ○ |
| Example 1-16 | ◎ | ○~◎ |
| Example 1-17 | ◎ | ◎ |
| Example 1-18 | ◎ | △~○ |
| Comparative example 1-1 | △~○ | △ |
| Comparative example Z-2 | ○ | X |

* Evaluation standard of adhesiveness (Good) ◎ > ○ > △ > X (Bad)

[2. Evaluation of Applicability to Surface Treatment to Tab Terminal Electrode for Li Ion Secondary Battery]

Li ion secondary batteries were prepared as described in the following Example 2-1 and Comparative examples 2-1 to 2-2, and applicability of the treating agent to the surface treatment of tab electrodes was evaluated by a leakage test of an electrolyte.

Preparation of Battery for Evaluation

Example 2-1

An aluminum foil was used for the positive electrode current collector, and a copper foil was used for the negative electrode current collector. From these current collectors, to the positive electrode was connected a tab terminal of an aluminum foil and to the negative electrode was connected a tab terminal of a nickel foil. Also, the surfaces of the tab terminals of the aluminum foil and the nickel foil were subjected to surface treatment in the same manner as in Example 1-1, and then, a maleated polypropylene film was welded thereto.

The positive electrode was prepared by mixing $LiCoO_2$ powder as a positive electrode active substance, carbon powder (Ketjen Black) as a conductive agent and PVdF powder as a binder with a weight ratio of 90:3:2:5, coating a slurry of the mixture onto the surface of the positive electrode current collector, and subjecting the resulting material to vacuum heat treatment. An area of the positive electrode was 52 cm², and a thickness thereof was 80 µm.

The negative electrode was prepared by mixing graphite powder as a negative electrode active substance and a fluorine resin as a binder with a weight ratio of 95:5, coating a slurry of the mixture onto the surface of the negative electrode current collector, and subjecting the resulting material to vacuum heat treatment. An area of the negative electrode plate was 58 cm², and a thickness thereof was 65 m.

As a separator, a porous film comprising a polypropylene was used.

The above-mentioned positive electrode, the separator and the negative electrode were laminated to prepare an electrode unit.

As a non-aqueous electrolyte, a material in which 1 mol/L of $LiPF_6$ had been dissolved in a mixed solvent of ethylene carbonate (EC) and diethyl carbonate (DEC) with a volume ratio of 5:5 was used.

Then, an aluminum laminate film was folded so that the above-mentioned electrode unit was sandwiched, three sides (upper edge portion and both side edge portions) were heat sealed to form an exterior body, and 3 ml of the above-mentioned non-aqueous electrolyte was injected therein. Incidentally, when the upper edge portion was to be sealed, sealing was so carried out that the tab terminals were sandwiched.

Comparative Example 2-1

A Li ion secondary battery was prepared in the same manner as in Example 2-1 except for carrying out the same surface treatment as in Comparative example 1-1 to the surface of the tab terminals of the positive and negative electrodes.

Comparative Example 2-2

A Li ion secondary battery was prepared in the same manner as in Example 2-1 except for carrying out the same surface treatment as in Comparative example 1-2 to the surface of the tab terminals of the positive and negative electrodes.

<Leakage Test>

Each 10 batteries of the above-mentioned Example 2-1, and Comparative examples 2-1 to 2-2 were subjected to a discharge test in a thermohygrostat bath at a temperature of 40° C. and a humidity of 90% by applying a load of 3.8V. As a result, with regard to the batteries of Example 2-1 and Comparative example 2-1, no abnormality was admitted in all 10 samples of the batteries after 7 days. On the other hand, with regard to the batteries of Comparative example 2-2, leakage of an electrolyte from the tab terminal portion was admitted in all 10 batteries among 10 samples.

From the results, it could be confirmed that the treating agent of the present invention could be applied to the surface treatment of a tab terminal electrode for a Li ion secondary battery.

[3. Evaluation of Applicability of Aluminum Laminate Package for Li Ion Secondary Battery to Aluminum Substrate Surface Treatment]

Li ion secondary battery was each prepared as described in Example 3-1 and Comparative examples 3-1 to 3-2, and an applicability of the treating agent to the surface treatment of an aluminum substrate of an aluminum laminate package was evaluated by a leakage test of an electrolyte.

Preparation of Battery for Evaluation

Example 3-1

The surface treatment was carried out in the same manner as in Example 1-1 except for coating the treating agent to an aluminum foil uniformly as an aluminum laminate package. Thereafter, a Nylon film was dry-laminated on one surface of the surface treated aluminum foil by using a urethane 2-liquids adhesive, and a maleic anhydride-modified polypropylene film was heat-laminated on the other surface to obtain an aluminum laminated film.

An aluminum foil was used for the positive electrode current collector, and a copper foil was used for the negative electrode current collector. From these current collectors, to the positive electrode was connected a tab terminal of an aluminum foil and to the negative electrode was connected a tab terminal of a nickel foil. Also, the surfaces of the tab terminals of the aluminum foil and the nickel foil were subjected to surface treatment in the same manner as in Example 1-1, and then, a maleated polypropylene film was welded thereto.

The positive electrode was prepared by mixing LiCoO$_2$ powder as a positive electrode active substance, carbon powder (Ketjen Black) as a conductive agent, and PVdF powder as a binder with a weight ratio of 90:3:2:5, coating a slurry of the mixture onto the surface of the positive electrode current collector, and subjecting the resulting material to vacuum heat treatment. An area of the positive electrode was 52 cm$^2$, and a thickness thereof was 80 μm.

The negative electrode was prepared by mixing graphite powder as a negative electrode active substance and a fluorine resin as a binder with a weight ratio of 95:5, coating a slurry of the mixture onto the surface of the negative electrode current collector, and subjecting the resulting material to vacuum heat treatment. An area of the negative electrode plate was 58 cm$^2$, and a thickness thereof was 65 μm.

As a separator, a porous film comprising a polypropylene was used.

The above-mentioned positive electrode, the separator and the negative electrode were laminated to prepare an electrode unit.

As a non-aqueous electrolyte, a material in which 1 mol/L of LiPF$_6$ had been dissolved in a mixed solvent of ethylene carbonate (EC) and diethyl carbonate (DEC) with a volume ratio of 5:5 was used.

Then, the above-mentioned aluminum laminate film was folded so that the polypropylene film became inside and the above-mentioned electrode unit was sandwiched, three sides thereof (upper edge portion and both side edge portions) were heat sealed to form an exterior body, and 3 ml of the above-mentioned non-aqueous electrolyte was injected therein. Incidentally, when the upper edge portion was to be sealed, sealing was so carried out that the tab terminals were sandwiched.

Comparative Example 3-1

A Li ion secondary battery was prepared in the same manner as in Example 3-1 except for using the same treating agent as in Comparative example 1-1 to the surface treatment of the aluminum foil of the aluminum laminated film.

Comparative Example 3-2

A Li ion secondary battery was prepared in the same manner as in Example 3-1 except for using the same treating agent as in Comparative example 1-2 to the surface treatment of the aluminum foil of the aluminum laminated film.

<Leakage Test>

Each 10 batteries of the above-mentioned Example 3-1, and Comparative examples 3-1 to 3-2 were subjected to a discharge test in a thermohygrostat bath at a temperature of 40° C. and a humidity of 90% by applying a load of 3.8V. As a result, with regard to the batteries of Example 3-1 and Comparative example 3-1, no abnormality was admitted in all 10 samples of the batteries after 7 days. On the other hand, with regard to the batteries of Comparative example 3-2, leakage of an electrolyte from the aluminum laminate periphery portion was admitted in all 10 batteries among 10 samples.

From the results, it could be confirmed that the treating agent of the present invention could be applied to the surface treatment of an aluminum substrate of an aluminum laminate package for a Li ion secondary battery.

UTILIZABILITY IN INDUSTRY

The metal surface treatment agent for a lithium secondary battery of the present invention can improve interlaminar adhesiveness between the metal material and the resin coating layer such as a film or a coated film and solvent resistance without using chromium, so that it can be utilized for a package for a lithium ion secondary battery, or film-attached tab lead member.

The invention claimed is:

1. A method of treating a surface of a metal member of a lithium ion secondary battery, the method comprising:
applying an aqueous metal surface treatment agent to the surface of the metal member;
wherein the aqueous metal surface treatment agent comprises:
a polyvinyl alcohol resin containing 2 to 15 mol % of a 1,2-diol structural unit represented by the formula (1):

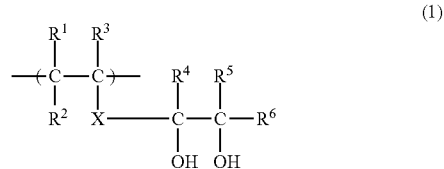

wherein R1, R2 and R3 each independently represent a hydrogen atom or an organic group, X represents a single bond or a connecting chain, and R4, R5 and R6 each independently represent a hydrogen atom or an organic group, and
the polyvinyl alcohol resin having a degree of saponification of 90 to 99.9 mol % and an average degree of polymerization of 250 to 3000;
a metallic crosslinking agent comprising a titanium compound; and
fluorozirconic acid.

2. The method of claim 1, wherein a molar ratio of polyvinyl alcohol resin to the total amount of the metallic crosslinking agent and fluorozirconic acid is 1:5 to 500:1.

3. The method of claim 1, wherein the metallic crosslinking agent is independently selected from the group consisting of an oxide, a hydroxide, a complex compound, an organometallic compound, an organic acid salt and an inorganic acid salt of titanium.

4. A metal member of a lithium ion secondary battery that has been treated with the aqueous metal surface treating agent in accordance with the method of claim 1.

5. The metal member according to claim 4, wherein the metal member is at least one component selected from a metal case for electronic parts, a metal laminate package for a lithium ion secondary battery, a film-attached tab lead member, and a surface treated tab terminal.

6. The method of claim 1, wherein the aqueous metal surface treatment agent further comprises at least one additional metallic crosslinking agent selected from the group consisting of an oxide, a hydroxide, a complex compound, an organometallic compound, an organic acid salt and an inorganic acid salt of aluminum, vanadium, molybdenum, cerium, lanthanum or tungsten.

* * * * *